(12) United States Patent
Hirohata et al.

(10) Patent No.: US 10,460,733 B2
(45) Date of Patent: Oct. 29, 2019

(54) SIGNAL PROCESSING APPARATUS, SIGNAL PROCESSING METHOD AND AUDIO ASSOCIATION PRESENTATION APPARATUS

(71) Applicant: KABUSHIKI KAISHA TOSHIBA, Minato-ku, Tokyo (JP)

(72) Inventors: Makoto Hirohata, Kawasaki Kanagawa (JP); Toru Taniguchi, Yokohama Kanagawa (JP); Taro Masuda, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/702,192

(22) Filed: Sep. 12, 2017

(65) Prior Publication Data
US 2018/0277120 A1 Sep. 27, 2018

(30) Foreign Application Priority Data

Mar. 21, 2017 (JP) .................................. 2017-054967

(51) Int. Cl.
| | |
|---|---|
| *G10L 21/02* | (2013.01) |
| *G10L 17/00* | (2013.01) |
| *G10L 21/14* | (2013.01) |
| *G06F 3/16* | (2006.01) |
| *G10L 21/038* | (2013.01) |
| *G10L 21/10* | (2013.01) |
| *G10L 21/0272* | (2013.01) |

(52) U.S. Cl.
CPC .............. *G10L 17/005* (2013.01); *G06F 3/16* (2013.01); *G06F 3/167* (2013.01); *G10L 21/038* (2013.01); *G10L 21/10* (2013.01); *G10L 21/14* (2013.01); *G10L 21/0272* (2013.01)

(58) Field of Classification Search
None
See application file for complete search history.

(56) References Cited

U.S. PATENT DOCUMENTS

2005/0060142 A1* 3/2005 Visser ................ G10L 21/0208
704/201
2009/0198495 A1 8/2009 Hata
(Continued)

FOREIGN PATENT DOCUMENTS

JP 2014-041308 A 3/2014
JP 6005443 B2 10/2016
(Continued)

*Primary Examiner* — Abul K Azad
(74) *Attorney, Agent, or Firm* — Knobbe, Martens, Olson & Bear, LLP

(57) ABSTRACT

According to one embodiment, a signal processing apparatus includes a memory and a processor electrically coupled to the memory. The processor separates a plurality of signals by a separation filter, and outputs a plurality of separate signals. The plurality of signals includes signals which are received at different positions and come from different directions. The processor estimates incoming directions of the plurality of separate signals, respectively, and associates the plurality of separate signals with transmission sources of the signals, and present association between the plurality of separate signals and the transmission sources of the signals.

10 Claims, 6 Drawing Sheets

(56) References Cited

U.S. PATENT DOCUMENTS

| | | | |
|---|---|---|---|
| 2012/0128174 A1* | 5/2012 | Tammi | H04S 1/002 381/92 |
| 2012/0263315 A1* | 10/2012 | Hiroe | G10L 21/0216 381/92 |
| 2013/0294608 A1* | 11/2013 | Yoo | G10L 21/0272 381/56 |
| 2014/0058736 A1* | 2/2014 | Taniguchi | G10L 19/00 704/500 |
| 2014/0226838 A1* | 8/2014 | Wingate | G10L 21/0272 381/111 |
| 2014/0328487 A1* | 11/2014 | Hiroe | G10L 21/0272 381/56 |
| 2017/0053662 A1 | 2/2017 | Nakadai et al. | |
| 2017/0078819 A1* | 3/2017 | Habets | H04S 7/30 |

FOREIGN PATENT DOCUMENTS

| | | |
|---|---|---|
| JP | 2017-040794 A | 2/2017 |
| WO | WO 2007/139040 A1 | 12/2007 |

* cited by examiner

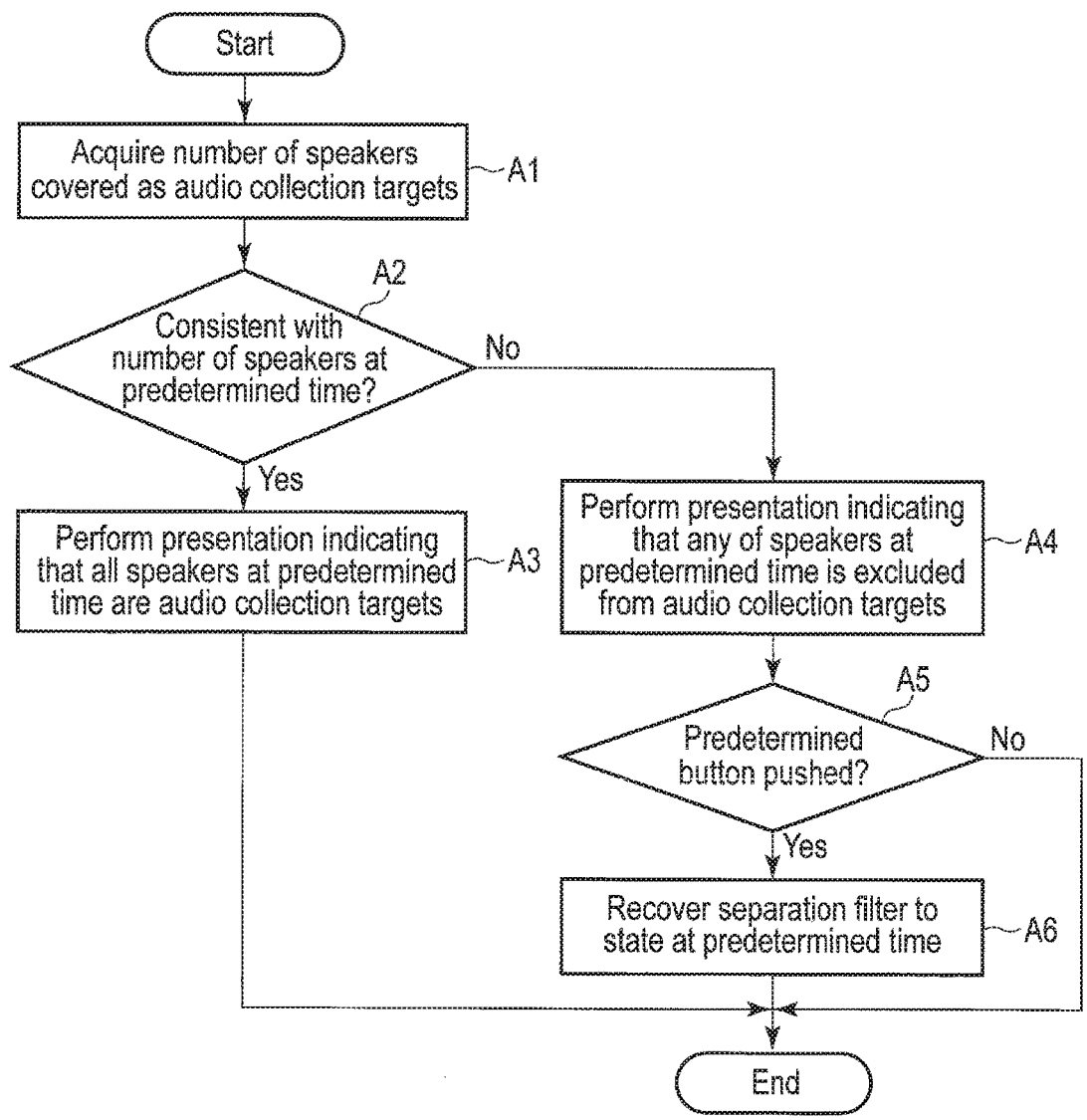
F I G. 10
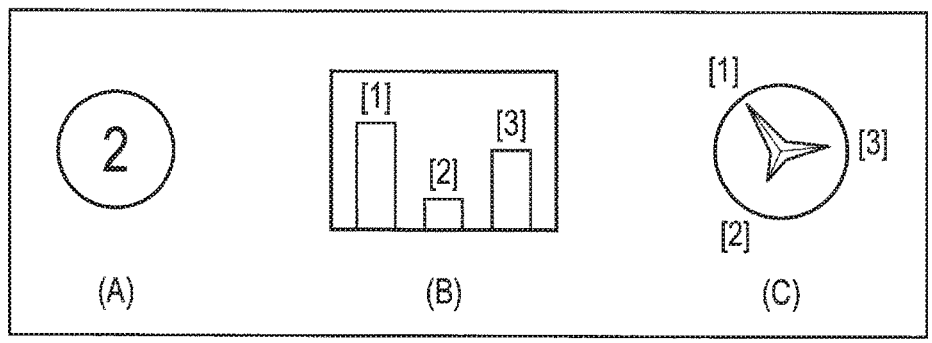
F I G. 11

SIGNAL PROCESSING APPARATUS, SIGNAL PROCESSING METHOD AND AUDIO ASSOCIATION PRESENTATION APPARATUS

CROSS-REFERENCE TO RELATED APPLICATIONS

This application is based upon and claims the benefit of priority from Japanese Patent Application No. 2017-054967, filed Mar. 21, 2017, the entire contents of which are incorporated herein by reference.

FIELD

Embodiments described herein relate generally to a signal processing apparatus, a signal processing method and an audio association presentation apparatus.

BACKGROUND

Recently, an activity of collecting and analyzing customer's voices for business improvement, etc., which is referred to as VOC (voice of the customer), etc., has been widely performed. Further, in connection with such a situation, various audio collection technologies have been proposed.

BRIEF DESCRIPTION OF THE DRAWINGS

FIG. 10 is a flowchart showing an example of the flow of processing related to presentation of an audio collection state of the signal processing apparatus of the embodiment.

FIG. 11 is a diagram showing some other examples of the object which the voice recorder application program of the embodiment displays on the screen during recording.

DETAILED DESCRIPTION

In general, according to one embodiment, a signal processing apparatus includes a memory and a processor electrically coupled to the memory. The processor is configured to: separate a plurality of signals by a separation filter, and output a plurality of separate signals, the plurality of signals including signals which are received at different positions and come from different directions; estimate incoming directions of the plurality of separate signals, respectively, and associate the plurality of separate signals with transmission sources of the signals; and present association between the plurality of separate signals and the transmission sources of the signals.

An embodiment will be described hereinafter with reference to the accompanying drawings.

Figure 1:
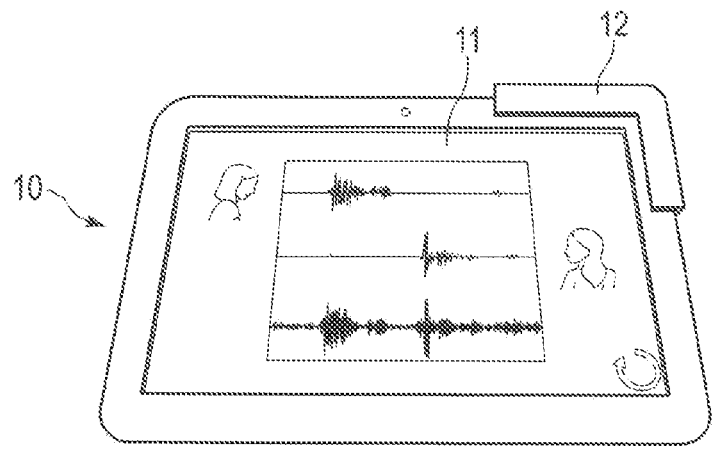
FIG. 1 is a diagram showing an example of the exterior appearance of a signal processing apparatus of an embodiment.

FIG. 1 is a diagram showing an example of the exterior appearance of a signal processing apparatus of the embodiment.

A signal processing apparatus 10 is realized, for example, as an electronic device which receives a touch operation with a finger or a pen (stylus) on a display screen. For example, the signal processing apparatus 10 may be realized as a tablet computer, a smartphone, etc. Note that the signal processing apparatus 10 receives not only a touch operation on the display screen but also, for example, operations of a keyboard and a pointing device which are externally connected, an operation button which is provided in the peripheral wall of the housing, etc. Here, it is assumed that the signal processing apparatus 10 receives a touch operation on the display screen, but the capability of receiving the touch operation on the display device is not prerequisite for this signal processing apparatus 10, and this signal processing apparatus 10 may only receive, for example, the operations of the keyboard, the pointing device, the operation button, etc.

As shown in FIG. 1, the signal processing apparatus 10 includes a touchscreen display 11. The signal processing apparatus 10 has, for example, a slate-like housing, and the touchscreen display 11 is arranged, for example, on the upper surface of the housing. The touchscreen display 11 includes a flat panel display and a sensor. The sensor detects a contact position of a finger or a pen on the screen of the flat panel display. The flat panel display is, for example, a liquid crystal display (LCD), etc. The sensor is, for example, a capacitive touch panel, an electromagnetic induction-type digitizer, etc. Here, it is assumed that the touchscreen display 11 includes both the touch panel and the digitizer.

Further, the signal processing apparatus 10 includes an audio input terminal which is not shown in FIG. 1, and is connectable to an audio input device (microphone array) 12 via the audio input terminal. The audio input device 12 includes a plurality of microphones. Further, the audio input device 12 has such a shape that the audio input device 12 can be detachably attached to one corner of the housing of the signal processing apparatus 10. FIG. 1 shows a state where the audio input device 12 connected to the signal processing apparatus 10 via the audio input terminal is attached to one corner of the main body of the signal processing apparatus 10. Note that the audio input device 12 is not necessarily formed in this shape. The audio input device 12 may be any device as long as the signal processing apparatus 10 can acquire sounds from a plurality of microphones, and for example, the audio input device 12 may be connected to the signal processing apparatus 10 via communication.

Figure 2:
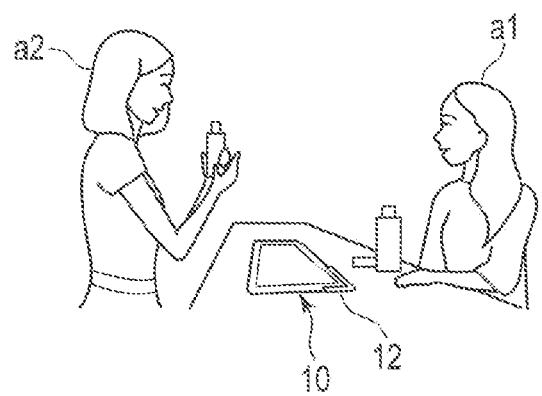
FIG. 2 is a diagram showing an example of the scene using the signal processing apparatus of the embodiment.

FIG. 2 is a diagram showing an example of the scene using the signal processing apparatus 10.

The signal processing apparatus 10 may be applied, for example, as an audio collection system designed for VOC, etc. FIG. 2 shows a situation where voices in the conversation between staff a2 and a customer a1 are collected by the audio input device 12 connected to the signal processing apparatus 10. The collected voices are separated into the speakers (the staff a2 and the customer a1) by the signal processing apparatus 10, and for example, the voice of the staff a2 is used for improving the manual of service to customers, and the voice of the customer a1 is used for understanding the needs of customers. The separation of the collected voices into the speakers will be described later in detail.

Figure 3:
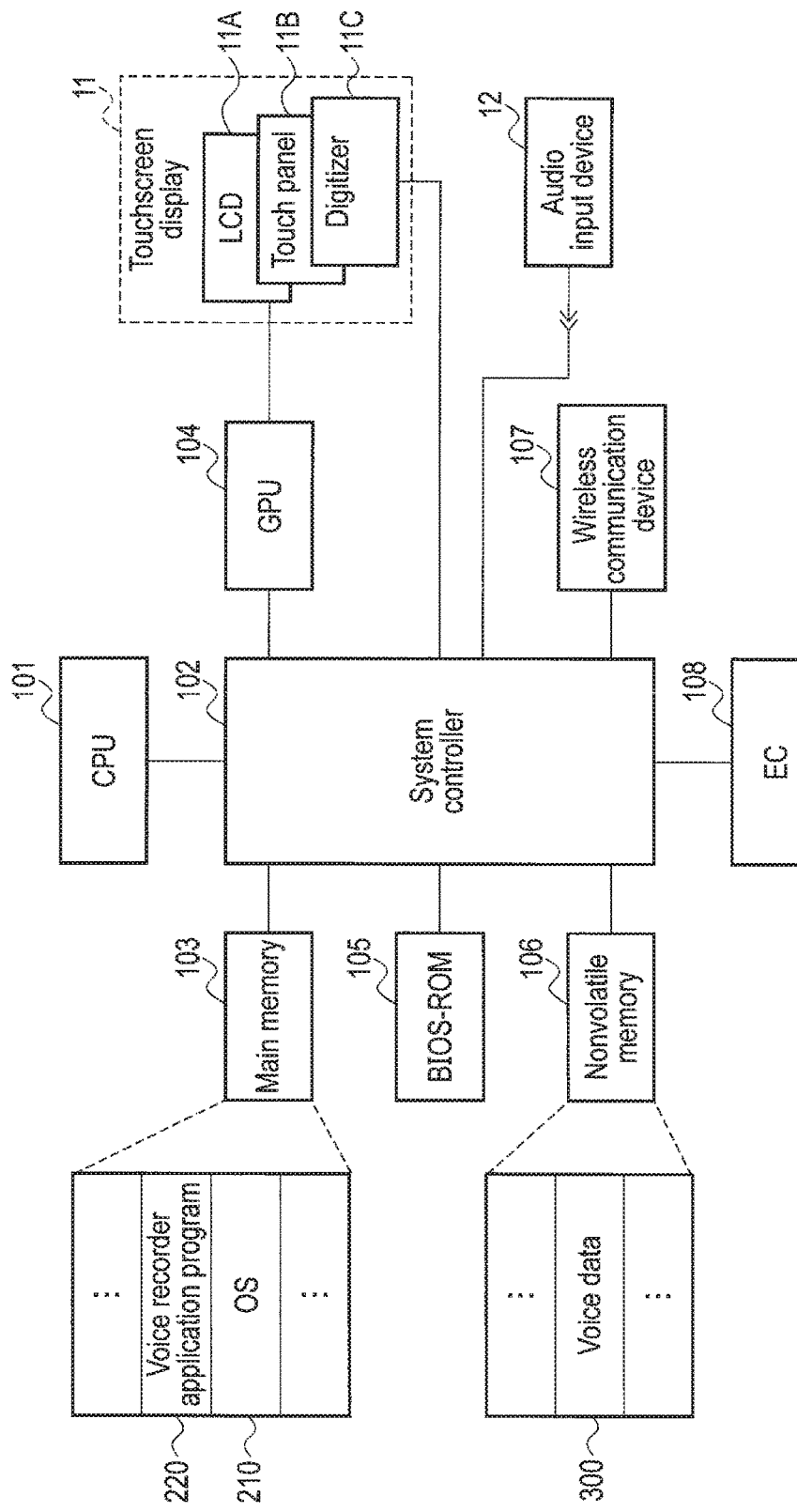
FIG. 3 is a diagram showing an example of the hardware structure of the signal processing apparatus of the embodiment.

FIG. 3 is a diagram showing an example of the hardware structure of the signal processing apparatus 10.

As shown in FIG. 3, the signal processing apparatus 10 includes a central processing unit (CPU) 101, a system controller 102, a main memory 103, a graphics processing unit (GPU) 104, a basic input/output system (BIOS) ROM 105, a nonvolatile memory 106, a wireless communication device 107, an embedded controller (EC) 108, etc.

The CPU 101 is a processor which controls the operations of various components in the signal processing apparatus 10. The CPU 101 loads various programs from the nonvolatile memory 106 into the main memory 103 and executes these programs. The programs include an operating system (OS) 210 and various application programs including a voice recorder application program 220. Although the voice recorder application program 220 will be described later in detail, the voice recorder application program 220 has the function of separating voices collected by the audio input device 12 into speakers, and storing in the nonvolatile memory 106 as voice data 300. Further, the CPU 101 also executes a BIOS stored in the BIOS ROM 105. The BIOS is a program responsible for hardware control.

The system controller 102 is a device which connects the local bus of the CPU 101 and the components. In the system controller 102, a memory controller which performs access control of the main memory 103 is also incorporated. Further, the system controller 102 also has the function of performing communication with the GPU 104 via a serial bus of a PCIe standard, etc. Still further, the system controller 102 also has the function of inputting sounds from the above-described audio input device 12 connected via the audio input terminal.

The GPU 104 is a display processor which controls an LCD 11A incorporated in the touchscreen display 11. The LCD 11A displays a screen image based on a display signal generated by the GPU 104. A touch panel 11B is arranged on the upper surface side of the LCD 11A, and a digitizer 11C is arranged on the lower surface side of the LCD 11A. The contact position of a finger on the screen of the LCD 11A, the movement of the contact position, etc., are detected by the touch panel 11B. Further, the contact position of a pen (stylus) on the screen of LCD 11A, the movement of the contact position, etc., are detected by the digitizer 11C.

The wireless communication device 107 is a device configured to perform wireless communication. The EC 108 is a single-chip microcomputer including an embedded controller responsible for power management. The EC 108 has the function of turning on or turning off the signal processing apparatus 10 according to the operation of a power switch. Further, the EC 108 includes a keyboard controller which receives the operations of the keyboard, the pointing device, the operation button, etc.

Figure 4:
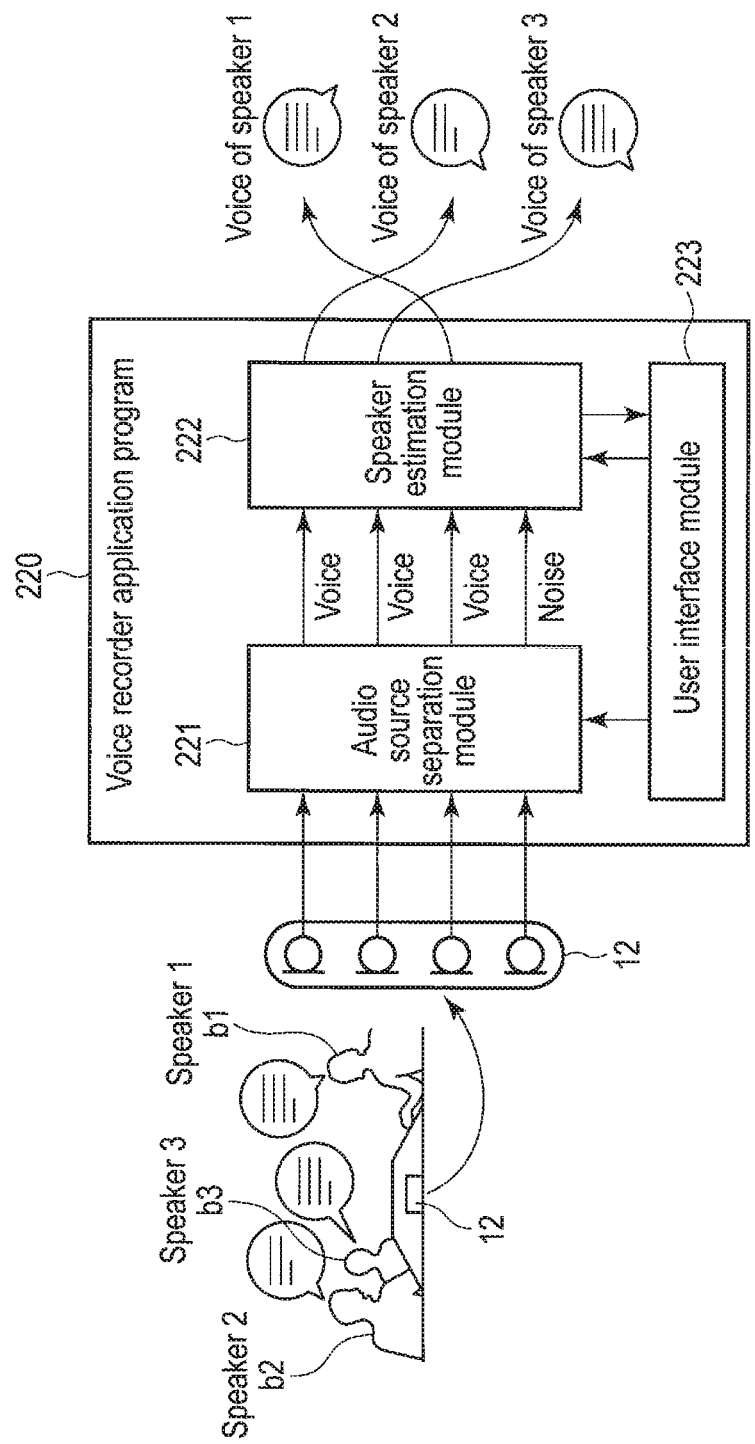
FIG. 4 is a diagram showing a structural example of the functional block of a voice recorder application program of the embodiment.

FIG. 4 is a diagram showing an example of the functional block of the voice recorder application program 220 which operates on the signal processing apparatus 10 of the above-described hardware structure.

As shown in FIG. 4, the voice recorder application program 220 includes an audio source separation module 221, a speaker estimation module 222, a user interface module 223, etc. Here, it is assumed that the voice recorder application program 220 is executed by being loaded from the nonvolatile memory 106 into the main memory 103 by the CPU 101. In other words, it is assumed that the processing portions of the audio source separation module 221, the speaker estimation module 222 and the user interface module 223 are realized by executing a program by a processor. Although only one CPU 101 is shown in FIG. 3, the processing units may be realized by a plurality of processors. Further, the processing portions are not necessarily realized by executing a program by a processor but may be realized, for example, by a special electronic circuit.

Now, a scene where voices in the conversation among three speakers, i.e., a speaker 1 (b1), a speaker 2 (b2) and a speaker 3 (b3) are collected by the audio input device 12 is assumed.

As described above, the audio input device 12 includes a plurality of microphones. The audio source separation module 221 inputs a plurality of audio signals from the microphones, separates the audio signals into a plurality of separate signals, and outputs the separate signals. More specifically, the audio source separation module 221 estimates from the audio signals, a separation matrix which is a filter (separation filter) used for separating the audio signals into the signals corresponding to the audio sources, multiplies the audio signals by the separation matrix, and acquires the separate signals. The estimation of the separation matrix is performed adoptively based on the input state of the audio signals. That is, the separation matrix is updated successively based on the input state of the audio signals. Further, the audio source separation module 221 has the function of maintaining a separation matrix which is estimated at a predetermined time, for example, at the time immediately after the start of recording, etc., when the voices of all the speakers can be easily collected. Note that the filter (separation filter) for separating audio signals into signals corresponding to audio sources is not limited to the separation matrix. That is, instead of using the separation matrix, a method of applying a finite impulse response (FIR) filter to audio signals and emphasizing (separating into) signals corresponding to audio sources can be applied.

The speaker estimation module 222 estimates the incoming directions of the separate signals output from the audio source separation module 221, respectively. More specifically, the speaker estimation module 222 calculates the directional characteristic distribution of the separate signals by using the separation matrix estimated by the audio source separation module 221, respectively, and estimates the incoming directions of the separate signals from the directional characteristic distribution, respectively. The directional characteristics are certainty (probability) that a signal comes at a certain angle, and the directional characteristic distribution is distribution acquired from directional characteristics of a wide range of angles. Based on the result of estimation, the speaker estimation module 222 can acquire the number of speakers (audio sources) and the directions of the speakers and can also associate the separate signals with the speakers.

Figure 5:
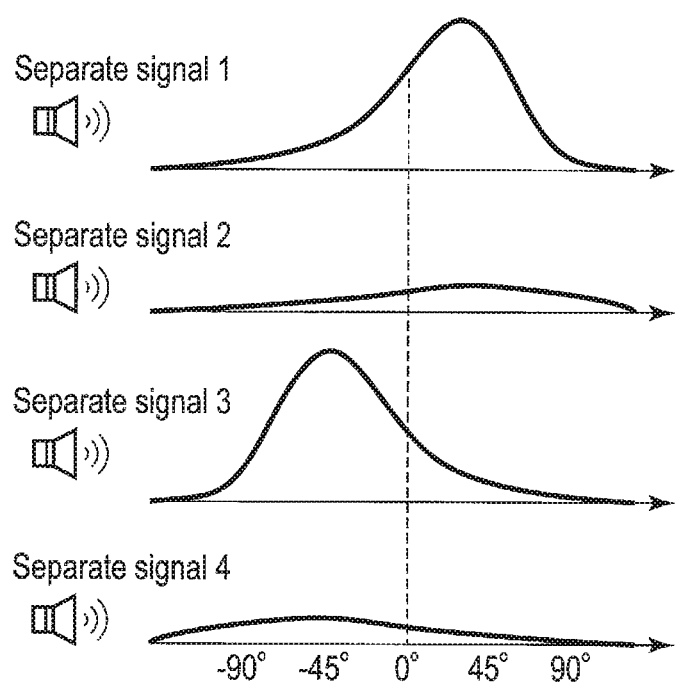
FIG. 5 is a diagram showing an example of the directional characteristic distribution of separate signals calculated by the voice recorder application program of the embodiment.

FIG. 5 is a diagram showing an example of the directional characteristic distribution of the separate signals calculated by the speaker estimation module 222.

FIG. 5 shows the directional characteristic distribution of separate signals 1 to 4. Since the separate signals 2 and 4 do not have directional characteristics showing certainty of a predetermined reference value or more, the speaker estimation module 222 determines that the separate signals 2 and 4 are noises. In the separate signal 1, since the directional characteristics at an angle of 45° have a maximum value and have a predetermined reference value or more, the speaker estimation module 222 determines that the separate signal 1 comes at an angle of 45°. In the separate signal 3, since the directional characteristics at an angle of −45° have a maximum value and show certainty of a predetermined reference value or more, the speaker estimation module 222 determines that the separate signal 3 comes at an angle of −45°. In other words, the separate signals 1 and 3 are separate signals whose incoming directions are estimated with certainty of a predetermined reference value or more. As a result of estimation by the speaker estimation module 222, the audio signals (separate signals) of the speakers are respectively stored in the nonvolatile memory 106 as the voice data 300.

The user interface module 223 performs an input/output process of outputting information to the user via the touchscreen display 11 and inputting information from the user via the touchscreen display 11. Note that the user interface module 223 can also input information from the user, for example, via the keyboard, the pointing device, the operation button, etc., and the input information includes the number of voice collection targets, i.e., speakers.

In the meantime, the audio source separation module 221 updates the separation matrix for separating the audio signals into the signals corresponding to the audio sources, successively, as described above. Accordingly, the association between the separate signals and the speakers may vary. More specifically, the number of speakers estimated by the speaker estimation module 222 by using the separation matrix, that is, the number of separate signals, among separate signals output from the audio source separation module 221, which are associated with speakers by the speaker estimation module 222 may vary. Here, an example of events which may occur when the separation matrix is successively updated will be described with reference to FIG. 6.

For example, it is assumed that three speakers, i.e., a speaker 1, a speaker 2 and a speaker 3 make speeches at a time (e1) when audio collection, i.e., recording, is started, but from a certain time (e2), only two speakers, i.e., the speaker 1 and the speaker 3 make speeches for a while. That is, it is assumed that the speech of the speaker 2 stops for a while. Note that not only the time when the recording is started, but also the time when the number of speakers estimated by the speaker estimation unit 22 becomes three may be set as the time e1.

If such a situation where only two speakers, i.e., the speaker 1 and the speaker 3 make speeches continues, the separation matrix is updated from a separation matrix suitable for separating the voices of three speakers, i.e., the speaker 1, the speaker 2 and the speaker 3 to a separation matrix suitable for separating the voices of two speakers, i.e., the speaker 1 and the speaker 3. Therefore, at a certain time (e3) after continuation of such a situation, it the speaker 2 makes a speech, for example, the voice at the beginning of the speech may not be separated or collected as the voice of the speaker 2.

Therefore, the signal processing apparatus 10 has such a structure that, firstly, an audio collection state can be visually recognized, and secondly, a separation matrix can be recovered to the state at a predetermined time, for example, the time immediately after the start of recording, etc., when the voices of all the speakers can be easily collected, and these points will be described below. The user does not have to be aware of the separation matrix of the audio source separation module 221, and the recovering of the separation matrix here may be recognized as optimization or reset of an operation environment setting of the voice recorder application program 220.

Figure 7:
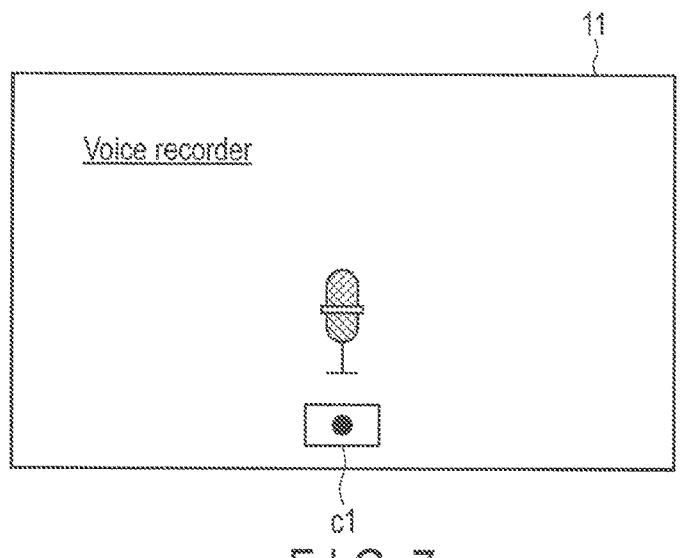
FIG. 7 is a diagram showing an example of the initial screen displayed by the voice recorder application program of the embodiment.

FIG. 7 is a diagram showing an example of the initial screen which the user interface module 223 displays on the touchscreen display 11 when the voice recorder application program 220 is initiated.

In FIG. 7, a reference symbol c1 denotes a recording button for starting audio collection, i.e., recording. If the recording button c1 is operated, the user interface module 223 notifies the start of processing to the audio source separation module 221 and the speaker estimation module 222. In this way, the recording by the voice recorder application program 220 is started. If a touch operation on the touchscreen display 11 corresponds to the display area of the recording button c1, a notification is provided from the OS 210 to the voice recorder application program 220, more specifically, to the user interface module 223, and the user interface module 223 recognizes that the recording button c1 is operated. If a finger, etc., placed on the display area of the recording button c1 is removed from the touchscreen display 11, a notification is also provided from the OS 210 to the user interface module 223, and thus the user interface module 223 recognizes that the operation of the recording button c1 is canceled. The same may be said of buttons other than the recording button c1.

Figure 8:
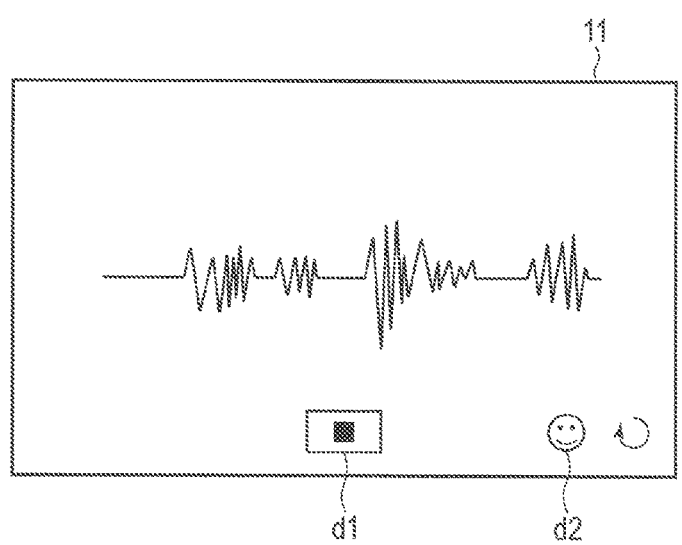
FIG. 8 is a diagram showing an example of the screen during recording displayed by the voice recorder application program of the embodiment.

On the other hand, FIG. 8 is a diagram showing an example of the screen during recording which the user interface module 223 displays on the touchscreen display 11 after the recording is started.

In FIG. 8, a reference symbol d1 denotes a stop button for stopping audio collection, i.e., recording. If the stop button d1 is operated, the user interface module 223 notifies the stop of processing to the audio source separation module 221 and the speaker estimation module 222.

Figure 6:
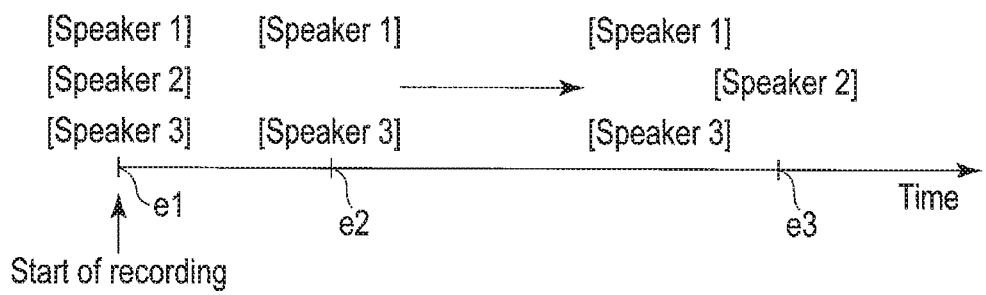
FIG. 6 is an explanatory diagram showing an example of events which may occur when a separation matrix for separating audio signals into signals corresponding to audio sources is successively updated.

Further, in FIG. 8, a reference symbol d2 is an object indicating an audio collection state. The object d2 also function as an operation button. The speaker estimation module 222 notifies the number of separate signals associated with speakers, i.e., the estimated number of speakers to the user interface module 223. For example, the number notified at the time indicated by the reference symbol e1 shown in FIG. 6 is three. While the number notified from the speaker estimation module 222 is consistent, i.e., three, the user interface module 223 indicates that the current audio collection state is a state where all of the speaker 1, the speaker 2 and the speaker 3 are covered as audio collection targets, by using the object d2. More specifically, the user interface module 223 displays the object d2 designed to indicate that the current audio collection state is a state where all the speakers are audio collection targets.

For example, it is assumed that, from the time indicated by the reference e2 shown in FIG. 6, only two speakers, i.e., the speaker 1 and the speaker 3 make speeches for a while, and as a result of update of the separation matrix by the audio source separation module 221, the number of speakers estimated by the speaker estimation module 222 changes to two. If the number notified from the speaker estimation module 222 becomes inconsistent, the user interface module 223 indicates that the current audio collection state is a state where any of the speakers is excluded from the audio collection targets, by using the object d2. That is, the user interface module 223 changes the object d2 to an object d2 designed to indicate that the current audio collection state is a state where any of the speakers is excluded from the audio collection targets.

Figure 9:
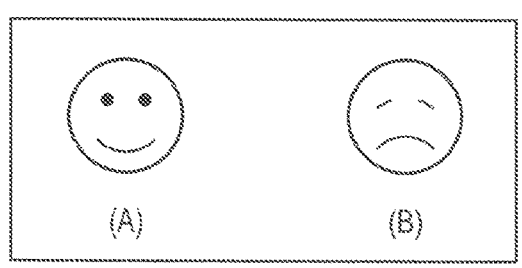
FIG. 9 is a diagram showing an example of an object which the voice recorder application program of the embodiment displays on the screen during recording.

FIG. 9 is a diagram showing an example of the object which the user interface module 223 displays on the screen during recording.

In FIG. 9, (A) shows an example of the object indicating that the current audio collection state is a state where all the speakers are audio collection targets, and (B) shows an example of the object indicating that the current audio collection state is a state where any of the speakers is excluded from the audio collection targets.

After recording is started by operating the recording button c1 on the initial screen shown in FIG. 7, the user can visually recognize an audio collection state from the object d2 displayed on the screen during recording shown in FIG. 8. That is, if the object d2 on the screen during recording shown in FIG. 8 is changed from the object shown in FIG. 9 (A) to the object shown in FIG. 9 (B), the user can recognize that any of the speakers is excluded from the audio collection targets.

Further, the object d2 also functions as an operation button as described above. For example, if the user recognizes from the object d2 that any of the speakers is excluded from the audio collection targets, the user operates the object d2. More specifically, the user performs a touch operation on the touchscreen display 11 with respect to the display area of the object d2.

If the object d2 is operated, the user interface module 223 notifies a request of recovering the separation matrix to the separation matrix which is maintained by the audio source separation module 221 and is estimated at a predetermined time, for example, the time immediately after the start of recording, etc., when the voices of all the speakers can be easily connected, with respect to the audio source separation module 221.

In this way, the speaker excluded from the audio collection targets as a result of interruption of the speech for a while can be recovered to the audio collection targets, and if this speaker makes a speech, for example, the voice can be separated and collected as the voice of this speaker from the beginning of the speech.

FIG. 10 is a flowchart showing an example of the flow of the processing related to the presentation of the audio collection state of the signal processing apparatus 10.

The signal processing apparatus 10 acquires the number of speakers covered as audio collection targets (Step A1), and determines whether the number is consistent with the number of speakers at a predetermined time, for example, the time immediately after the start of recording, etc., when the voices of all the speakers can be easily collected (Step A2). If the number of the speakers is consistent (Step A2; YES), the signal processing apparatus 10 presents an audio collection state where all the speakers are audio collection targets in the object d2 (Step A3).

On the other hand, if the number of the speakers is inconsistent (Step A2; NO), the signal processing apparatus 10 presents an audio collection state where any of the speakers is excluded from the audio collection targets in the object d2 (Step A4). Subsequently, the signal processing apparatus 10 examines the presence and absence of the operation of the object d2 (Step A5), and if the object d2 is operated, recovers the separation matrix which is a filter (separation filter) for separating audio signals into signals corresponding to audio sources, to the state at a predetermined time, for example, the time immediately after the start of recording, etc., when the voices of all the speakers can be easily collected (Step A6).

Accordingly, in the signal processing apparatus 10, the audio collection state can be visually recognized, and for example, the separation matrix can be recovered to the state at a predetermined time, for example, the time immediately after the start of recording, etc., when the voices of all the speakers can be easily collected.

That is, the signal processing apparatus 10 functions as an audio association presentation apparatus including a generation portion which acquires a plurality of sounds from different direction and generates a plurality of separate sounds, and a presentation portion which presents association between the separate sounds and the sounds based on incoming directions of the separate sounds. Further, the signal processing apparatus 10 further includes a reception portion which receives a user's instruction, and the generation portion which generates the separate sounds by using a separation filter, and the signal processing apparatus 10 functions as an audio association presentation apparatus which initializes the separation filter based on the user's instruction. Note that the object d2 indicating an audio collection state on the screen during recording can adopt various forms. FIG. 11 shows some other examples of the form of the object d2.

FIG. 11 (A) shows an example of the object d2 showing the number of separate signals, among separate signals output from the audio source separation module 221, which are associated with speakers by the speaker estimation module 222. For example, in the audio collection of the conversation of three speakers such as that shown in FIG. 6, if the number shown in the object d2 is three, the user can recognize that all the speakers are audio collection targets, and if the number shown in the object d2 is changed from three to two, the user can recognize that any of the speakers is excluded from the audio collection targets. If the user recognizes that any of the speakers is excluded from the audio collection targets, the user can recover the separation matrix to the state at a predetermined time, for example, at the time immediately after the start of recording, etc., when the voices of all the speakers can be easily collected, by operating the object d2.

Further, FIG. 11 (B) shows an example of the object d2 showing the number of separate signals, among separate signals output from the audio source separation module 221, which are associated with speakers by the speaker estimation module 222, and also showing the certainty of estimation of the incoming directions of the separate signals. In this case, the speaker estimation module 222 also notifies the directional characteristics (maximum values in the directional characteristic distribution) of the separate signals to the user interface module 223. As described above, the directional characteristics are certain that a signal comes at a certain angle, and thus the user interface module 223 displays the object d2 in the design of a bar graph where separate signals associated with speakers are expressed as line segments and the levels of certainty are expressed as the lengths of the line segments. According to this object d2, the user can recognize that any of the speakers (here, the speaker 2) is about to be excluded from the audio collection targets, and before the speaker is excluded from the audio collection targets, the user can recover the separation matrix to the state at a predetermined time, for example, at the time immediately after the start of recording, etc., when the voices of all the speakers can be easily collected, by operating the object d2.

Still further, FIG. 11 (C) also shows an example of the object d2 showing the number of separate signals, among separate signals output from the audio source separation module 221, which are associated with speakers by the speaker estimation module 222, and also showing the certainty of estimation of the incoming directions of the separate signals.

The user interface module 223 displays the object d2 in the design of a chart where separate signals associated with speakers are expressed as line segments, the directions are expressed as needles and the levels of certainty are expressed as the lengths of the needles. According to this object d2, the user can further recognize which speaker is about to be excluded from the audio collection targets from the directions and the lengths of the needles, and before the speaker is excluded from the audio collection targets, the user can recover the separation matrix to the state at a predetermined time, for example, at the time immediately after the start of recording, etc., when the voices of all the speakers can be easily collected, by operating the object d2.

As described above, according to the signal processing apparatus 10, the audio collection state can be visually recognized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A signal processing apparatus comprising:
a memory; and
a hardware processor electrically coupled to the memory, and configured to:
separate a plurality of signals using a separation filter to obtain a plurality of separate signals, and output the plurality of separate signals, the plurality of signals including signals which come from different directions,
estimate incoming directions of the plurality of separate signals, respectively, and associate the plurality of separate signals with the incoming directions,
output for display an association between the plurality of separate signals and the incoming directions,
estimate the separation filter from the plurality of signals and successively update the separation filter, and
receive an instruction to recover the separation filter to a first state of a first time.

2. The signal processing apparatus of claim 1, wherein the hardware processor is further configured to display an object indicative of whether the number of the plurality of separate signals associated with the incoming directions at the first time is consistent with the number of the plurality of separate signals associated with the incoming directions at a present time differing from the first time.

3. The signal processing apparatus of claim 1, wherein the hardware processor is further configured to display an object indicative of the number of the plurality of separate signals associated with the incoming directions.

4. The signal processing apparatus of claim 1, wherein the hardware processor is further configured to display an object indicative of levels of certainty of the incoming directions of the plurality of separate signals associated with the incoming directions which are estimated respectively with respect to the plurality of separate signals.

5. The signal processing apparatus of claim 4, wherein the object is presented as a bar graph where the levels of certainty are expressed as lengths of line segments.

6. The signal processing apparatus of claim 1, wherein the hardware processor is further configured to display an object indicative of directions of the plurality of separate signals associated with the incoming directions.

7. The signal processing apparatus of claim 6, wherein the object indicates levels of certainty of the incoming directions of the separate signals associated with the incoming directions which are estimated respectively with respect to the separate signals.

8. The signal processing apparatus of claim 7, wherein the object is presented as a chart where the directions are expressed as needles and the levels of certainty are expressed as lengths of the needles.

9. A signal processing method comprising:
separating a plurality of signals using a separation filter to obtain a plurality of separate signals, and outputting the plurality of separate signals, the plurality of signals including signals which come from different directions;
estimating incoming directions of the plurality of separate signals, respectively, and associating the plurality of separate signals with the incoming directions;
outputting for display an association between the plurality of separate signals and the incoming directions;
estimating the separation filter from the plurality of signals and successively update the separation filter; and
receiving an instruction to recover a separation matrix of the separation filter to a first state of a first time.

10. An audio association presentation apparatus comprising:
a memory; and
a hardware processor electrically coupled to the memory and configured to:
receive a plurality of sounds coming from different directions, and generate a plurality of separate sounds based on the plurality of sounds,
output for display an association between the plurality of separate sounds and the plurality of sounds based on incoming directions of separate sounds from the plurality of separate sounds,
receive a user's instruction, and
generate the separate sounds by using a separation filter, and initialize the separation filter based on the user's instruction.

* * * * *